(12) United States Patent
Weeks

(10) Patent No.: US 11,969,121 B2
(45) Date of Patent: Apr. 30, 2024

(54) COOKWARE LID AND UTENSIL HOLDER DEVICE

(71) Applicant: Patricia Weeks, Kent, OH (US)

(72) Inventor: Patricia Weeks, Kent, OH (US)

(*) Notice: Subject to any disclaimer, the term of this patent is extended or adjusted under 35 U.S.C. 154(b) by 0 days.

(21) Appl. No.: 17/697,256

(22) Filed: Mar. 17, 2022

(65) Prior Publication Data
US 2023/0157488 A1   May 25, 2023

Related U.S. Application Data

(60) Provisional application No. 63/281,890, filed on Nov. 22, 2021.

(51) Int. Cl.
| | |
|---|---|
| *A47J 47/16* | (2006.01) |
| *A47B 77/14* | (2006.01) |
| *A47B 55/02* | (2006.01) |

(52) U.S. Cl.
CPC ............ *A47J 47/16* (2013.01); *A47B 77/14* (2013.01); *A47B 55/02* (2013.01)

(58) Field of Classification Search
CPC .......... A47J 47/16; A47J 47/20; A47B 77/14; A47B 5/02; A47B 81/04; A47F 7/0057; A47F 7/0064; A47G 19/08
See application file for complete search history.

(56) References Cited

U.S. PATENT DOCUMENTS

| | | | | |
|---|---|---|---|---|
| 1,078,804 | A * | 11/1913 | Royse | A47G 19/30 248/163.2 |
| 1,544,291 | A * | 6/1925 | Wright | A61J 9/0638 211/74 |
| 1,807,500 | A * | 5/1931 | West | A47B 23/007 248/413 |
| 2,286,831 | A * | 6/1942 | Ressinger | A47F 5/01 D6/672 |
| 2,452,929 | A * | 11/1948 | Holcomb | B62B 1/042 280/DIG. 6 |
| 2,588,529 | A * | 3/1952 | Hume | B65H 49/16 211/85.5 |
| D248,809 | S * | 8/1978 | Kailey | D6/552 |
| D262,678 | S * | 1/1982 | DeBoer | D8/373 |
| 4,458,585 | A * | 7/1984 | Erbach | A47J 37/0786 99/426 |
| D282,323 | S * | 1/1986 | Fetty | D8/380 |
| 4,776,469 | A * | 10/1988 | Geleziunas | A47J 47/16 211/41.11 |
| D311,651 | S * | 10/1990 | Fetty | D7/704 |
| 4,979,759 | A * | 12/1990 | Solovay | B62H 3/10 248/166 |

(Continued)

*Primary Examiner* — Devin K Barnett
(74) *Attorney, Agent, or Firm* — Brennan, Manna & Diamond, LLC

(57) ABSTRACT

The present invention relates to a novel cookware lid and utensil holder device that safely and securely stores hot cookware lids and/or utensils while cooking without placing the items on a countertop and/or stovetop. The device comprises a base unit and a tubular, metal stand comprising at least one U-shaped component that receives a cookware lid and/or utensil. Users place cookware lids and/or utensils on the U-shaped component for storage while cooking. Further, the device can be positioned near a stovetop, preventing users from having to place hot cookware lids and/or utensils directly on the stovetop and/or countertop.

9 Claims, 6 Drawing Sheets

(56) References Cited

U.S. PATENT DOCUMENTS

| | | | | |
|---|---|---|---|---|
| 5,002,190 A * | 3/1991 | Moreland | ............... | A47G 25/10 211/32 |
| D320,332 S * | 10/1991 | Fetty | ............... | D7/638 |
| 5,127,529 A * | 7/1992 | Martinez | ............... | A47G 25/00 211/37 |
| D335,405 S * | 5/1993 | Tiedge | ............... | D6/552 |
| 5,396,993 A * | 3/1995 | Spitler | ............... | A47J 47/16 248/37.3 |
| 5,601,268 A * | 2/1997 | Dunchock | ............... | B60N 3/106 248/311.2 |
| D389,703 S * | 1/1998 | Marts | ............... | D7/601 |
| D394,291 S * | 5/1998 | Beltran | ............... | D6/552 |
| D405,300 S * | 2/1999 | Regan | ............... | D6/629 |
| D408,229 S * | 4/1999 | Hong | ............... | D7/638 |
| D429,922 S * | 8/2000 | Walker | ............... | D6/552 |
| D444,020 S * | 6/2001 | Muth | ............... | D6/678.4 |
| 6,431,054 B1 * | 8/2002 | Reid | ............... | G01K 1/14 374/E1.018 |
| D476,847 S * | 7/2003 | Kingsley | ............... | D7/396.1 |
| D497,516 S * | 10/2004 | Roberts | ............... | D7/601 |
| D604,224 S * | 11/2009 | Carpenter | ............... | D12/411 |
| 8,028,876 B2 * | 10/2011 | Carpenter | ............... | B62K 19/46 224/434 |
| D677,504 S * | 3/2013 | Childs | ............... | D6/552 |
| D725,938 S * | 4/2015 | Hendricks | ............... | D6/552 |
| D776,983 S * | 1/2017 | Bruce | ............... | D7/601 |
| D778,635 S * | 2/2017 | Pan | ............... | D6/535 |
| 9,756,985 B2 * | 9/2017 | Knight, Sr. | ............... | A47J 47/16 |
| 10,315,321 B2 * | 6/2019 | Frierson | ............... | A45D 44/02 |
| 11,457,579 B2 * | 10/2022 | Christiaens | ............... | A01G 18/70 |
| 11,641,938 B1 * | 5/2023 | Cotterill | ............... | A47B 81/04 211/41.11 |
| 2005/0194334 A1 * | 9/2005 | Johnson | ............... | A45D 8/36 211/85.2 |
| 2007/0194002 A1 * | 8/2007 | Fisher | ............... | F24C 7/085 219/400 |
| 2007/0275101 A1 * | 11/2007 | Lu | ............... | C09D 5/1625 514/642 |
| 2009/0289052 A1 * | 11/2009 | Bakke | ............... | D06F 59/08 219/521 |
| 2014/0367350 A1 * | 12/2014 | Waksul | ............... | A47F 7/0071 211/41.2 |
| 2015/0014495 A1 * | 1/2015 | Bausman | ............... | A47J 47/16 248/176.2 |
| 2015/0296979 A1 * | 10/2015 | Todd | ............... | A47B 75/00 211/85.4 |
| 2016/0106266 A1 * | 4/2016 | Heron | ............... | A47J 45/00 220/574 |
| 2016/0174772 A1 * | 6/2016 | Heron | ............... | A47J 47/16 248/37.6 |
| 2017/0267431 A1 * | 9/2017 | Sheikh | ............... | A01N 25/10 |
| 2018/0125330 A1 * | 5/2018 | Naik | ............... | A47L 15/4261 |
| 2020/0132538 A1 * | 4/2020 | Marivoet | ............... | G01G 19/42 |
| 2020/0221906 A1 * | 7/2020 | Allamby | ............... | A47J 36/06 |
| 2020/0305680 A1 * | 10/2020 | Wilson | ............... | A47L 15/0005 |
| 2020/0397196 A1 * | 12/2020 | Nie | ............... | A47B 77/14 |
| 2022/0081046 A1 * | 3/2022 | Narita | ............... | G07C 5/0866 |
| 2022/0112381 A1 * | 4/2022 | Hunt | ............... | A01N 59/16 |
| 2022/0280392 A1 * | 9/2022 | Baxter | ............... | A47J 41/0094 |

\* cited by examiner

COOKWARE LID AND UTENSIL HOLDER DEVICE

CROSS-REFERENCE TO RELATED APPLICATION

The present application claims priority to, and the benefit of, U.S. Provisional Application No. 63/281,890, which was filed on Nov. 22, 2021 and is incorporated herein by reference in its entirety.

FIELD OF THE INVENTION

The present invention relates generally to the field of cookware lids and utensil holders. More specifically, the present invention relates to an improved cookware lid and utensil holder device that provides a place for users to store their hot cookware lids and utensils while cooking. The device improves safety when cooking and ensures that both hot cookware lids and utensils can be stored without worry of accidental touching. Accordingly, the present disclosure makes specific reference thereto. Nonetheless, it is to be appreciated that aspects of the present invention are also equally applicable to other like applications, devices and methods of manufacture.

BACKGROUND

By way of background, substantial amounts of time are spent in the kitchen as food is essential. When cooking, there is often a need to remove the lid from the cookware in use. This is done for multiple reasons, such as to add ingredients to the food cooking, to let steam out from the cookware for venting, etc. To do so, the cookware lid is entirely lifted from the cookware in use and must be set down somewhere else. However, in some kitchens, there is a lack of space to do so and it becomes troublesome to find room to put the lid down. Other times, the lid needs to be removed only momentarily. Holding the lid over a countertop and/or stovetop while stirring causes the lid to drip liquids from the cooking lid, which causes messes on the countertop and/or stovetop. Further, holding the lid in one hand while stirring is dangerous and can lead to the cookware moving from over the stovetop flame.

Furthermore, if a user puts the lid on the countertop face down, the lid tends to leave a pool of water or a circle of cooked food on the counter. If the lid is placed on the countertop upside down with the knob on the counter, this makes it difficult for a user to pick up and can cause burns when handled. Additionally, if a hot lid is placed on a smooth, glass-top stovetop, it can create a vacuum-like suction that can be strong enough to crack and break the stovetop.

Another option is placing the lid and/or utensils in the sink or on top of another cookware pot on the stove, which can lead to dirtying additional cookware and risking the chance that a user may need the lid again. Generally, the utensils would be placed, if not on the counter, in the sink if close by, on top of a cookware pot on the stove, or in another container with water. However, all of these actions can lead to food spillage on the countertop and/or stovetop that lead to messes and additional dishes and/or areas to clean.

Thus, it is necessary for users to have a safe and easy device for storing cookware lids and utensils when cooking. Generally, the irregular shape of cookware lids, their knobs and/or handles have proven difficult for prior art devices to solve the problem. Therefore, users require a device that improves safety when cooking, reduces mess, and ensures that both hot lids and utensils can be stored without worry of accidental touching.

Therefore, there exists a long-felt need in the art for a cookware lid and utensil holder device that provides a user with a place for storing cookware lids and utensils while cooking. There is also a long-felt need in the art for a cookware lid and utensil holder device that eliminates the need for users to place hot cookware lids and utensils on a countertop and/or stovetop. Further, there is a long-felt need in the art for a cookware lid and utensil holder device that ensures safety while cooking and reduces mess. Moreover, there is a long-felt need in the art for a device that prevents unsanitary contamination or damage to the cookware lids and/or utensils. Further, there is a long-felt need in the art for a cookware lid and utensil holder device that can be used for storing, securing, and stabilizing hot cookware lids and/or utensils while cooking. Finally, there is a long-felt need in the art for a cookware lid and utensil holder device that offers a way for cooks or any user to safely store hot cookware lids and/or utensils while cooking, without placing the items on a countertop and/or stovetop.

The subject matter disclosed and claimed herein, in one embodiment thereof, comprises a cookware lid and utensil holder device. The device is designed to safely and securely store hot cookware lids and/or utensils while cooking, without placing the items on a countertop and/or stovetop. The device comprises a tubular, metal stand comprising at least one U-shaped component that receives a cookware lid and/or utensil. The base unit supports the metal stand which extends upward from the base unit at approximately a 65-degree angle. Users place cookware lids and/or utensils on the U-shaped component for storage while cooking. The cookware lids are placed upside down with the knob protruding through the U-shaped component, allowing users to easily grasp the knob without the worry of burning themselves. Further, the device can be positioned near a stovetop, preventing users from having to place hot cookware lids and/or utensils directly on the stovetop and/or countertop.

In this manner, the cookware lid and utensil holder device of the present invention accomplishes all of the forgoing objectives and provides users with a device that safely and securely stores hot cookware lids and/or utensils while cooking. The device allows a user to store cookware lids and/or utensils, while reducing mess and preventing damage to the lids and utensils. The device eliminates the need for users to place hot cookware lids and/or utensils on a countertop and/or stovetop.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cookware lid and utensil holder device. The device is designed to safely and securely store hot cookware lids and/or utensils while cooking, without placing the items on a countertop and/or stovetop. The device comprises a tubular, metal stand comprising at least one U-shaped component, or other suitable shaped component, that receives a cookware lid and/or utensil.

Preferably, there are two U-shaped components for storing multiple cookware lids and/or utensils, but any suitable number of U-shaped components can be included on the stand. The device further comprises a base unit which supports the metal stand, allowing it to stand upright. Specifically, the metal stand extends upward from the base unit at approximately a 65-degree angle, or any other suitable angle as is known in the art.

In one embodiment, users place cookware lids and/or utensils on the U-shaped component for storage while cooking. The cookware lids are positioned upside down with the knob protruding through the space defined by the U-shaped component allowing users to easily grasp the knob without worry of burning themselves. Further, the device can be positioned near a stovetop, preventing users from having to place hot cookware lids and/or utensils directly on the stovetop and/or countertop.

In another embodiment, the U-shaped components, the metal stand, and the base unit are machined as one piece. The U-shaped components, the metal stand, and the base unit can be manufactured separately and secured together to form the device. Typically, the device would be welded together.

In another embodiment, the base unit is a U-shaped design but can be any other suitable shape as is known in the art, as long as the base unit supports the metal stand. The base unit is connected to the upright metal stand, which is then connected to the horizontally positioned, U-shaped component. The U-shaped component is where the cookware lid and/or utensils are stored when in use.

In yet another embodiment, the metal stand is held by the base unit, such that it tilts slightly to the back, at an angle. This allows any condensation from the cookware lid and/or utensils to remain in the lid or utensil. In one embodiment, the base unit also comprises a container component that can be placed on the base unit or in the opening defined by the base unit, directly under the cookware lid. The container component is typically shaped as a bowl, but can be any suitable shape and size as is known in the art. The container component can also retain utensils if necessary. The container component is removable and rests in the space defined by the base unit, it is not secured to the base unit or the metal stand. This allows the container component to be easily emptied when needed.

In yet another embodiment, the device comprises a temperature sensor component. The temperature sensor component is positioned on the metal stand and/or U-shaped components, such that contact with a hot cookware lid causes it to change colors and/or light up. The temperature sensor can be a light that turns on when hot and off when cool, or a color changing sensor that turns blue when cool and turns red when hot, alerting users when the hot cookware lid has cooled and is safe to touch.

In yet another embodiment, the cookware lid and utensil holder device is manufactured from a food-grade material, such as aluminum, stainless steel alloys, PET (Polyethylene Terephthalate), HDPE (High-Density Polyethylene), LDPE (Low-Density Polyethylene), PVC (Polyvinyl Chloride), PP (Polypropylene), or PS (Polystyrene), or other suitable material as is known in the art.

In yet another embodiment, the cookware lid and utensil holder device is manufactured with an antibacterial coating.

In yet another embodiment, a method of storing a cookware lid and utensil while cooking, without placing the items on a countertop and/or stovetop, is described. The method includes the steps of providing a cookware lid and utensil holder device. The device comprises a base unit connected to a metal stand, connected to a U-shaped component for storing the cookware lids and utensils. Users place cookware lids and/or utensils on the U-shaped component for storage while cooking. The cookware lids are positioned upside down with the knob protruding through the space defined by the U-shaped component, allowing users to easily grasp the knob without worry of burning themselves. Further, the device is positioned near a stovetop, preventing users from having to place hot cookware lids and/or utensils directly on the stovetop and/or countertop.

In yet another embodiment of the present invention, a cookware lid and utensil holder device is disclosed for safely and securely storing hot cookware lids and/or utensils while cooking, without placing the items on a countertop and/or stovetop. The device comprises a base unit and a tubular, metal stand comprising at least one U-shaped component that receives a cookware lid and/or utensil. The base unit supports the metal stand, which extends upward from the base unit at approximately a 65-degree angle. Users place cookware lids and/or utensils on the U-shaped component for storage while cooking. More than one U-shaped component can be included on the metal stand to allow for multiple cookware lids and/or utensils to be stored on the device. The cookware lids are placed upside down with the knob protruding through the U-shaped component, allowing users to easily grasp the knob without worry of burning themselves. Further, the device can be positioned conveniently in the kitchen area, to improve safety and sanitary conditions in the kitchen while reducing mess and cleanup times when cooking.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
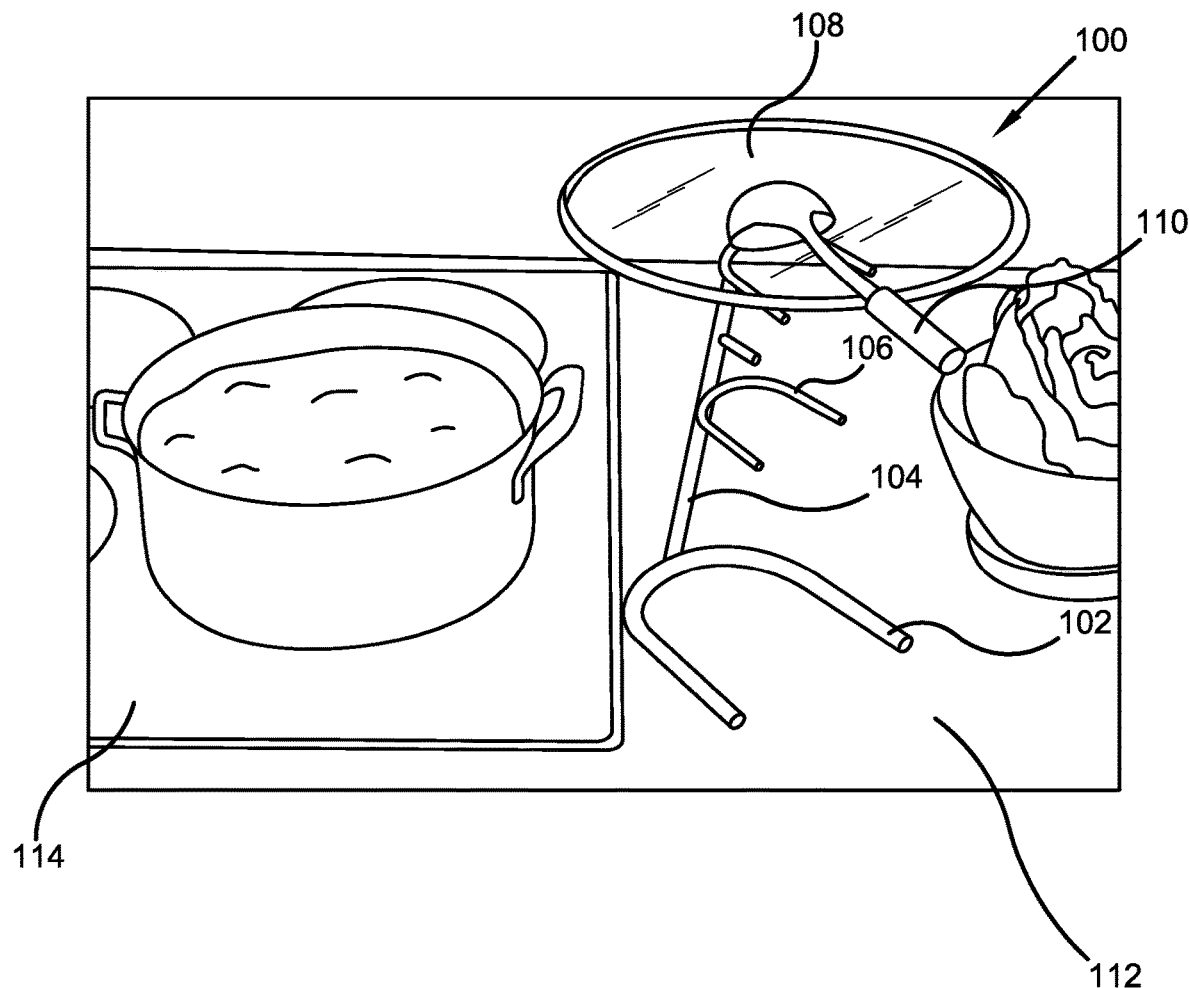
FIG. 1 illustrates a perspective view of one potential embodiment of the cookware lid and utensil holder device of the present invention, wherein a lid and utensil are stored on the device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a cookware lid and utensil holder device that provides a user with a place for storing cookware lids and utensils while cooking. There is also a long-felt need in the art for a cookware lid and utensil holder device that eliminates the need for users to place hot cookware lids and utensils on a countertop and/or stovetop. Further, there is a long-felt need in the art for a cookware lid and utensil holder device that ensures safety while cooking and reduces mess. Moreover, there is a long-felt need in the art for a device that prevents unsanitary contamination or damage to the cookware lids and/or utensils. Finally, there is a long-felt need in the art for a cookware lid and utensil holder device that can be used for storing, securing, and stabilizing hot cookware lids and/or utensils while cooking.

The present invention, in one exemplary embodiment, is a novel cookware lid and utensil holder device comprising a base unit and a tubular, metal stand comprising at least one U-shaped component. The base unit supports the metal stand, which extends upward from the base unit. Users place cookware lids and/or utensils on the U-shaped component for storage while cooking. The present invention also includes a novel method of storing a cookware lid and utensil while cooking. The method includes the steps of providing a cookware lid and utensil holder device. Users place cookware lids and/or utensils on the U-shaped component of the device for storage while cooking. Further, the device is positioned near a stovetop, preventing users from having to place hot cookware lids and/or utensils directly on the stovetop and/or countertop.

Referring initially to the drawings, FIG. 1 illustrates a perspective view of one embodiment of the cookware lid and utensil holder device 100 of the present invention. In the present embodiment, the cookware lid and utensil holder device 100 is an improved lid and utensil holder device that safely and securely stores cookware lids and utensils while cooking. The device 100 is especially designed to allow cooks, or any user that cooks, etc., or any other suitable user as is known in the art, to store hot lids and utensils while cooking, without placing the items on a countertop 112 and/or stovetop 114.

More specifically, the device 100 comprises a base unit 102 and a metal stand 104. The metal stand 104 is typically tubular in shape but can be any suitable shape as is known in the art, such as a rectangle or oval, etc., depending on the needs and/or wants of a user. The base unit 102 is typically a U-shaped rod but can be any suitable shape or structure as is known in the art, such as round, square, rectangular, etc., as long as the base unit 102 supports the metal stand 104, allowing it to stand upright, in a vertical position. Specifically, the metal stand 104 extends upward from the base unit 102 at approximately a 65-degree angle, or any other suitable angle as is known in the art.

Furthermore, the device 100 comprises at least one U-shaped component 106, or other suitable shaped component as is known in the art, that receives a cookware lid 108 and/or utensil 110. For example, besides being a U-shaped component 106, the component 106 could be V-shaped, W-shaped, etc., or any other suitable shape that would securely retain a cookware lid 108. Furthermore, at least one U-shaped component 106 is provided, however, preferably, there are two U-shaped components 106 secured at varying positions along the length of the metal stand 104. Having more than one U-shaped component 106 allows a user to store multiple cookware lids 108 and/or utensils 110 at one time on the device 100. However, any suitable number of U-shaped components 106 can be included on the metal stand 104 as is known in the art, depending on the wants and/or needs of a user. Similarly, the device 100 is comprised of at least one retaining prong 107 positioned above and/or below each component 106. In this manner, the prong 107 contacts the upper or lower surface of a lid 108 such that the lid 108 cannot fall off of the component 106.

Figure 2:
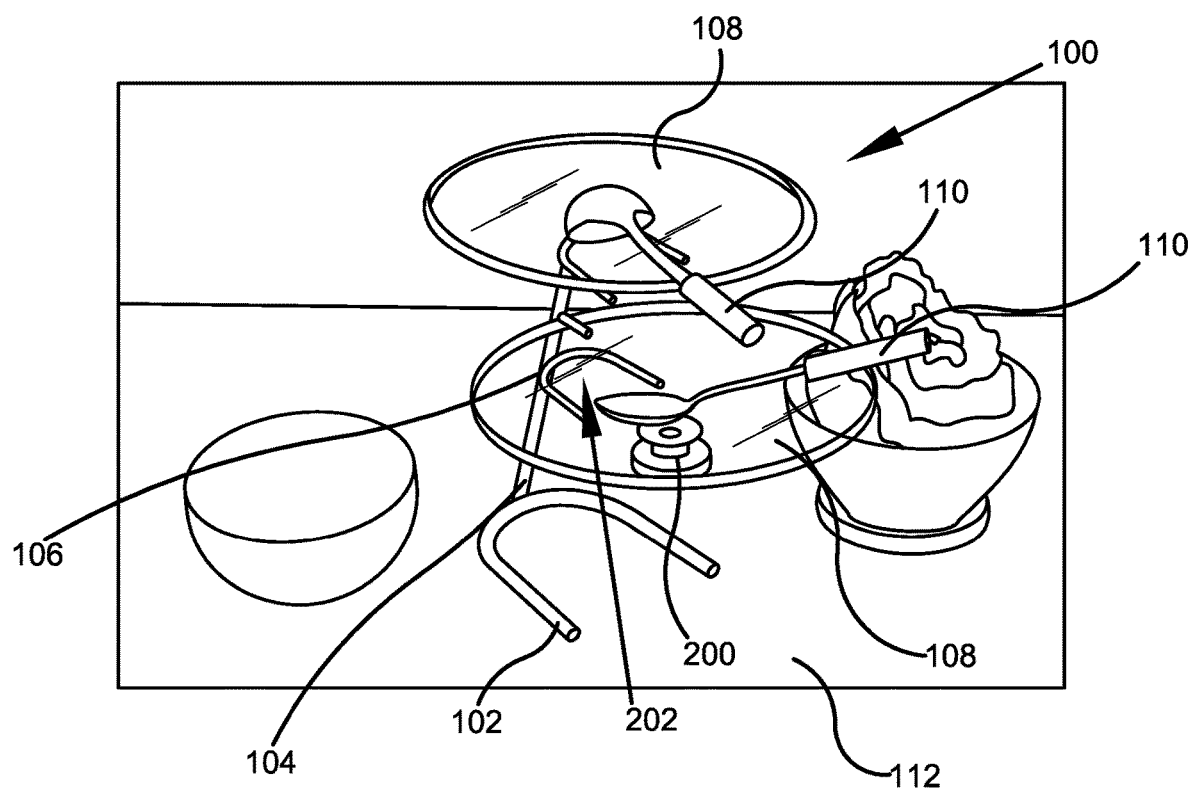
FIG. 2 illustrates a perspective view of another potential embodiment of the cookware lid and utensil holder device of the present invention, wherein multiple lids and utensils are stored on the device in accordance with the disclosed architecture.

FIG. 2 illustrates a perspective view of another embodiment of the cookware lid and utensil holder device 100 of the present invention wherein multiple lids 108 and utensils 110 are stored on the device 100. As stated supra, multiple U-shaped components 106 can be secured at varying positions along the length of the metal stand 104, to retain multiple cookware lids 108 and/or utensils 110 at one time on the device 100. Furthermore, users place the cookware lids 108 and/or utensils 110 on the U-shaped component 106 for storage while cooking. Specifically, the cookware lids 108 are positioned upside down with the knob 200 protruding through the space 202 defined by the U-shaped component 106, securely retaining the lids 108 on the device and allowing users to easily grasp the knob 200 without the worry of burning themselves. Further, the device 100 can be positioned near a stovetop 114, preventing users from having to place hot cookware lids 108 and/or utensils 110 directly on the stovetop 114 and/or countertop 112.

Figure 3:
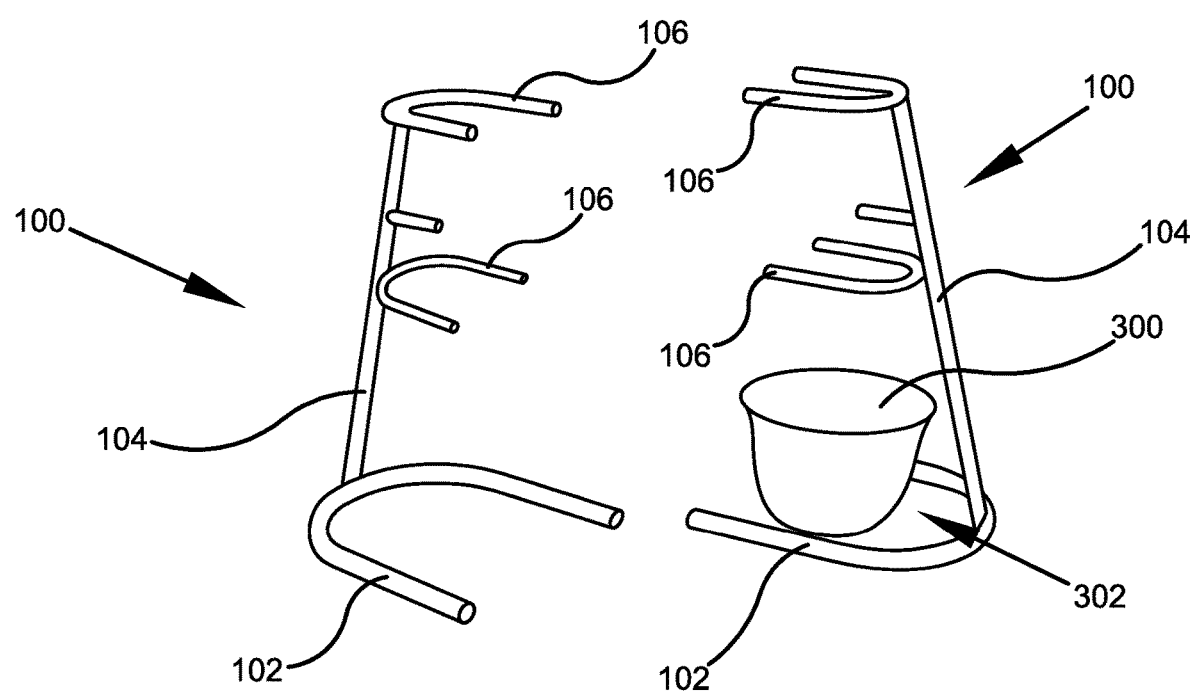
FIG. 3 illustrates left and right perspective views of one potential embodiment of a pair of the cookware lid and utensil holder device of the present invention in accordance with the disclosed architecture.

FIG. 3 illustrates left and right perspective views of a pair of the cookware lid and utensil holder device 100 of the present invention in accordance with the disclosed architecture. In one embodiment, the U-shaped components 106, the metal stand 104, and the base unit 102 are machined as one piece. However, the U-shaped components 106, the metal stand 104, and the base unit 102 can be manufactured separately and secured together to form the device 100. Typically, if manufactured separately, the device 100 would be welded together. However, any other suitable fastening means as is known in the art could be utilized to secure the components together, such as gluing, screwing, bolting, etc.

In another embodiment, the metal stand 104 is secured to the base unit 102, such that the metal stand 104 tilts slightly to the front, at an angle. Specifically, the metal stand 104 extends from the base unit 102 at approximately a 65-degree angle. However, any other suitable angle could be utilized as well, depending on the needs and/or wants of a user. Extending the metal stand 104 at an angle, allows any water, and/or condensation from the cookware lid 108 and/or utensils 110 to remain in the lid 108 or utensil 110.

In this embodiment, the base unit 102 also comprises a container component 300 that can be placed on the base unit 102 or in the opening 302 defined by the base unit 102, directly under the cookware lid 108. The container component 300 is typically bowl-shaped with an open cavity, but can be any suitable shape and size as is known in the art. The container component 300 can also retain utensils 110, if necessary. The container component 300 is removable and rests in the space 302 defined by the base unit 102. Typically, the container component 300 is not secured to the base unit 102 or the metal stand 104. This allows the container component 300 to be easily emptied when needed. However, in additional embodiments, the container component 300 can be secured to the base unit 102 via any suitable securing means as is known in the art. However, in one embodiment the container component 300 may be in the form a small saucer that can be used to set utensils 110 on when not in use.

Figure 4:
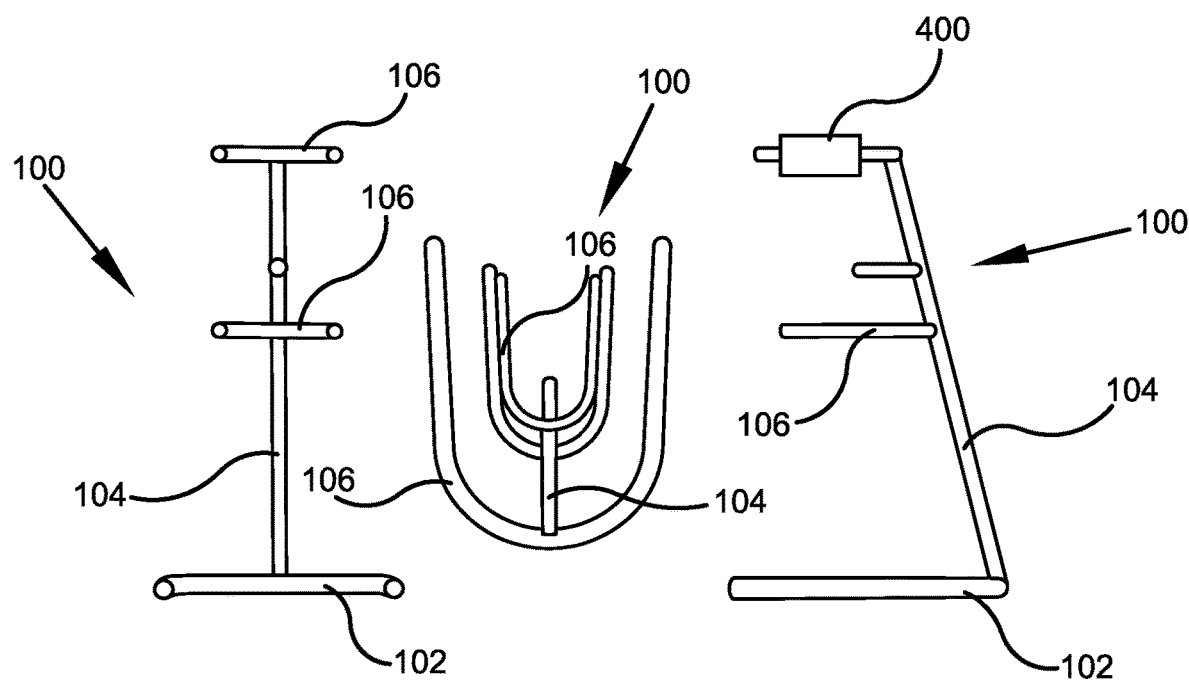
FIG. 4 illustrates one potential embodiment of the cookware lid and utensil holder device of the present invention from multiple perspectives in accordance with the disclosed architecture.

FIG. 4 illustrates a perspective view showing multiple perspectives of the cookware lid and utensil holder device 100 of the present invention. Specifically, as stated supra, the base unit 102 is a U-shaped design but can be any other suitable shape as is known in the art, as long as the base unit 102 supports the metal stand 104, allowing the stand 104 to stand upright in a vertical position. The base unit 102 is connected to the vertically positioned metal stand 104, which is then connected to the horizontally positioned U-shaped component 106. The U-shaped component 106 is where the cookware lid 108 and/or utensils 110 are stored when in use.

In another embodiment, the device 100 comprises a temperature sensor component 400 as an additional safety feature. The temperature sensor component 400 is positioned on the metal stand 104 and/or the U-shaped components 106, such that contact with a hot cookware lid 108 causes the sensor 400 to change colors and/or light up. Specifically, the temperature sensor component 400 can be a light that turns on when hot and off when cool, or a color changing sensor that turns blue when cool and turns red when hot, alerting users when the hot cookware lid 108 has cooled and is safe to touch. For example, in one embodiment, the color-changing temperature sensor component 400 turns blue when the temperature is below 80° F. (26.7° C.), then darkens to magenta from 80° F. (26.7° C.) to 110° F. (43.3° C.), and then turns red at temperatures above 110° F. (43.3° C.). A user could then look at the temperature sensor component 400 before touching the hot cookware lid 108, to determine if the lid 108 is cool enough to touch.

The cookware lid and utensil holder device 100 is typically manufactured from a weighted food-grade material, or any other suitable material as is known in the art, such as but not limited to, aluminum, stainless steel alloys, PET (Polyethylene Terephthalate), HDPE (High-Density Polyethylene), LDPE (Low-Density Polyethylene), PVC (Polyvinyl Chloride), PP (Polypropylene), or PS (Polystyrene), etc. Generally, the cookware lid and utensil holder device 100 is also manufactured with an antibacterial and/or antimicrobial coating, to promote sanitation and eliminate food contamination.

Figure 5:
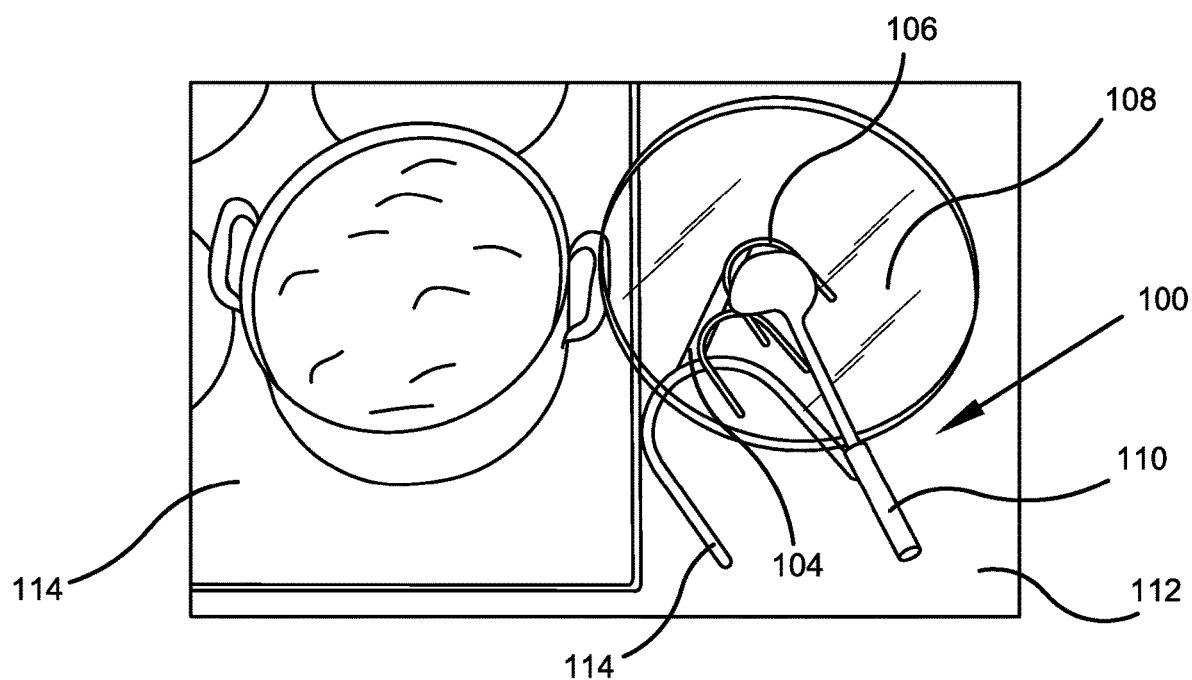
FIG. 5 illustrates a perspective view of one potential embodiment of the cookware lid and utensil holder device of the present invention in use in accordance with the disclosed architecture.

FIG. 5 illustrates a perspective view of the cookware lid and utensil holder device 100 of the present invention in use. The cookware lid and utensil holder device 100 is disclosed for safely and securely storing hot cookware lids 108 and/or utensils 110 while cooking without placing the items on a countertop 112 and/or stovetop 114. The device 100 comprises a base unit 102 and a tubular, metal stand 104 comprising at least one U-shaped component 106 that receives a cookware lid 108 and/or utensil 110. The base unit 102 supports the metal stand 104, which extends upward from the base unit 102 at approximately a 65-degree angle. Users place cookware lids 108 and/or utensils 110 on the U-shaped component 106 for storage while cooking. More than one U-shaped component 106 can be included on the metal stand 104 to allow for multiple cookware lids 108 and/or utensils 110 to be stored on the device 100. The cookware lids 108 are placed upside down with the knob 200 protruding through the U-shaped component 106, allowing users to easily grasp the knob 200 without the worry of burning themselves. Further, the device 100 can be positioned conveniently in the kitchen area, to improve safety and sanitary conditions in the kitchen, while reducing mess and cleanup times when cooking.

Figure 6:
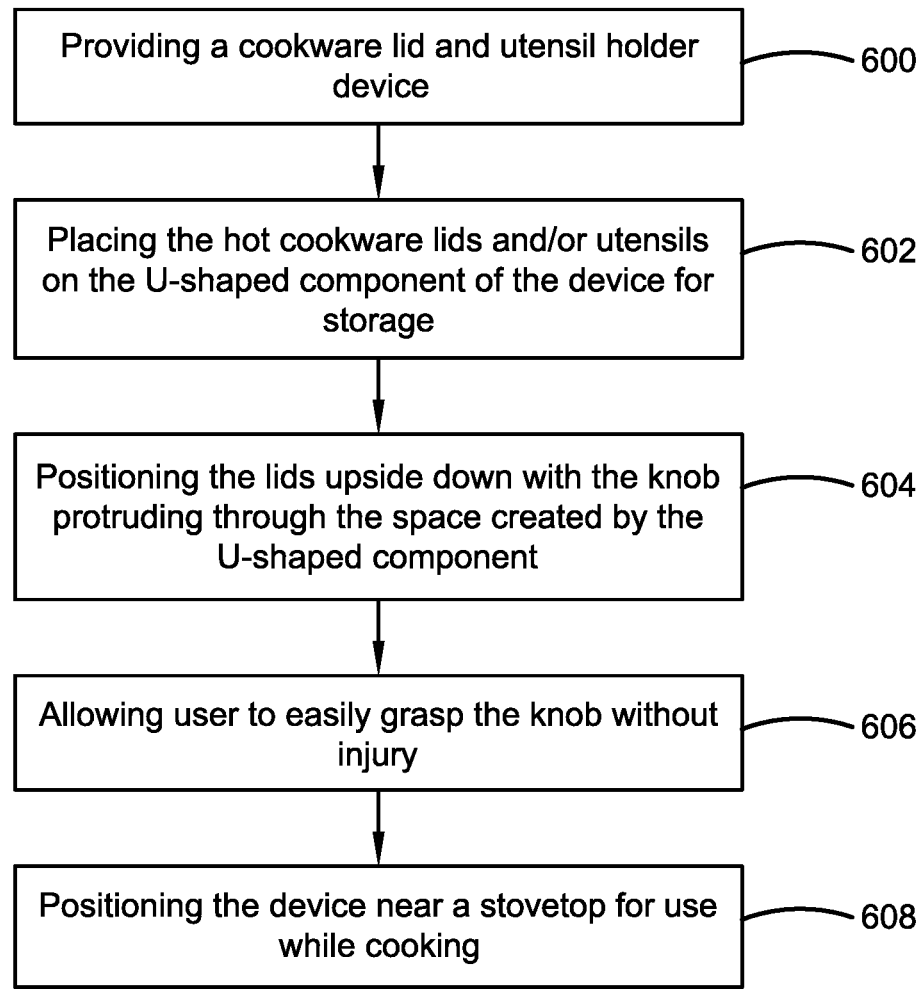
FIG. 6 illustrates a flowchart showing the method of storing a cookware lid and utensil while cooking, without placing the items on a countertop and/or stovetop in accordance with the disclosed architecture.

FIG. 6 illustrates a flowchart of the method of storing a cookware lid and utensil while cooking without placing the items on a countertop and/or stovetop. The method includes the steps of at 600, providing a cookware lid and utensil holder device. The device comprises a base unit connected to a metal stand, connected to a U-shaped component for storing the cookware lids and utensils. At 602, the users place the hot cookware lids and/or utensils on the U-shaped component, for storage while cooking. At 604, the hot cookware lids are positioned upside down with the knob protruding through the space defined by the U-shaped component, which at 606, allows users to easily grasp the knob without worry of burning themselves. Further, at 608, the device is positioned near a stovetop, preventing users from having to place hot cookware lids and/or utensils directly on the stovetop and/or countertop.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "cookware lid and utensil holder device" and "device" are interchangeable and refer to the cookware lid and utensil holder device 100 of the present invention.

Notwithstanding the forgoing, the cookware lid and utensil holder device 100 of the present invention can be of any suitable size and configuration as is known in the art without affecting the overall concept of the invention, provided that it accomplishes the above-stated objectives. One of ordinary skill in the art will appreciate that the cookware lid and utensil holder device 100 as shown in FIGS. 1-6 is for illustrative purposes only, and that many other sizes and shapes of the cookware lid and utensil holder device 100 are well within the scope of the present disclosure. Although the dimensions of the cookware lid and utensil holder device 100 are important design parameters for user convenience, the cookware lid and utensil holder device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cookware lid and utensil holder device for safely and securely storing a cookware lid and a utensil while cooking, the cookware lid and utensil holder device comprising:
    a base unit, wherein the base unit is a U-shaped rod;
    a metal stand secured to the base unit; and
    a first U-shaped component secured to the metal stand for receiving a cookware lid and an utensil, wherein the base unit supports the metal stand, thereby allowing the metal stand to extend upwards from the base unit at 65-degrees angle to retain condensation from the cookware lid or utensil in the cookware lid, and further wherein the base unit, the metal stand, and the at least one U-shaped component are manufactured as a single piece;
    at least one retaining prong positioned on the metal stand either above or below the first U-shaped component and configured to contact an upper or a lower surface of the cookware lid to prevent the cookware lid from falling off the first U-shaped component.

2. The cookware lid and utensil holder device of claim 1 further comprising a second U-shaped components.

3. The cookware lid and utensil holder device of claim 2 wherein the first and second U-shaped components are secured at varying positions along a length of the metal stand.

4. The cookware lid and utensil holder device of claim 1 wherein the cookware lid is configured to be positioned upside down with a knob of the cookware lid protruding through a space defined by the first U-shaped component.

5. The cookware lid and utensil holder device of claim 1 further comprising a container component positioned near the base unit.

6. The cookware lid and utensil holder device of claim 1 further comprising a temperature sensor component positioned on the metal stand or the first U-shaped component.

7. The cookware lid and utensil holder device of claim 6, wherein
    the temperature sensor component comprises a color changing means that is configured to turns blue when cool and is configured to turns-a red when hot, to alert a user when the cookware lid is safe to touch.

8. The cookware lid and utensil holder device of claim 6, wherein the temperature sensor component comprises an indicator light for alerting a user when the cookware lid is safe to touch.

9. The cookware lid and utensil holder device of claim 1 further comprising an antibacterial or antimicrobial coating to promote sanitation and eliminate food contamination.

* * * * *